United States Patent [19]

Nagano

[11] Patent Number: 4,731,045
[45] Date of Patent: Mar. 15, 1988

[54] DERAILLEUR FOR A BICYCLE

[75] Inventor: Masashi Nagano, Izumi, Japan

[73] Assignee: Shimano Industrial Company Limited, Osaka, Japan

[21] Appl. No.: 919,438

[22] Filed: Oct. 16, 1986

[30] Foreign Application Priority Data

Oct. 24, 1985 [JP] Japan .................. 60-163244[U]

[51] Int. Cl.$^4$ ................................. F16H 9/06
[52] U.S. Cl. ...................... 474/78; 474/80; 474/82
[58] Field of Search .................. 474/78, 80–83

[56] References Cited

U.S. PATENT DOCUMENTS

| 3,964,330 | 6/1976 | Ozaki | 474/80 |
| 4,362,523 | 12/1982 | Huret | 474/82 |
| 4,610,644 | 9/1986 | Nagano | 474/82 |

FOREIGN PATENT DOCUMENTS

| 3528376 | 3/1986 | Fed. Rep. of Germany . |
| 2314093 | 1/1977 | France . |
| 2506251 | 11/1982 | France . |

Primary Examiner—James A. Leppink
Assistant Examiner—Thuy M. Bui
Attorney, Agent, or Firm—Stevens, Davis, Miller & Mosher

[57] ABSTRACT

A bicycle derailleur which includes a linkage mechanism formed of a base member, an inner linkage member, an outer linkage member, and a movable member carrying a chain guide. The derailleur also includes a connecting assembly formed of a pair of connecting pins for respectively pivotably supporting one end of each of the inner and outer linkage members to the base member and a pair of connecting pins for respectively pivotably supporting the movable member to the other end of each of the inner and outer linkage members. The connecting pins are oriented obliquely with respect to a predetermined plane perpendicular to the axis of the sprocket assembly. The chain guide, responsive to deformation of the linkage mechanism, moves axially and radially of the sprocket assembly. The inner linkage member has an upper surface at its end connected to the base member which is positioned on a side closer to the axis of the multi-stage sprocket assembly relative to a line extending from the upper surface of the outer linkage member at its end connected to the base member and perpendicular to the axis of the connecting pin connecting the outer linkage member to the base member.

4 Claims, 6 Drawing Figures

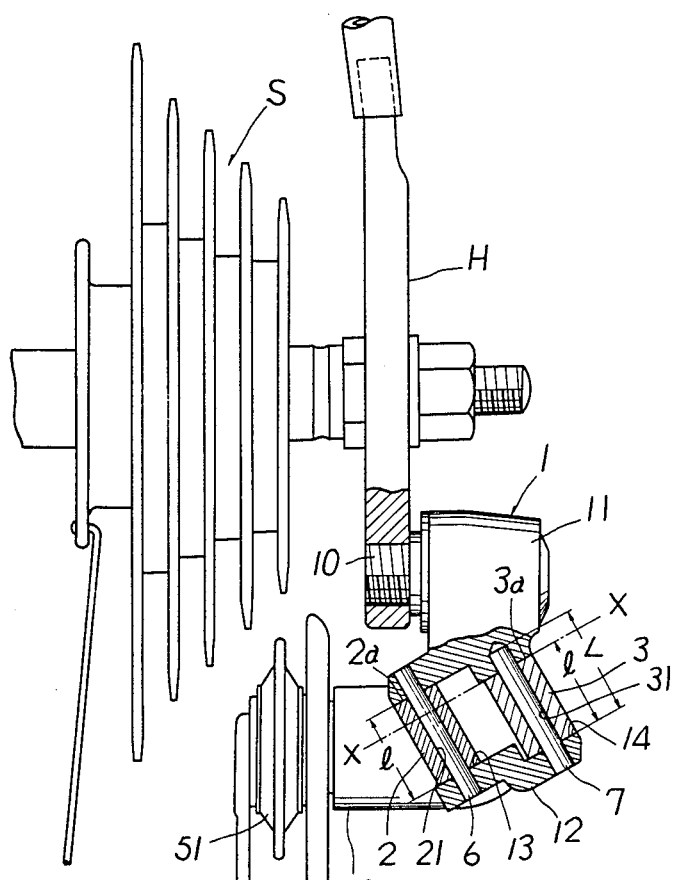
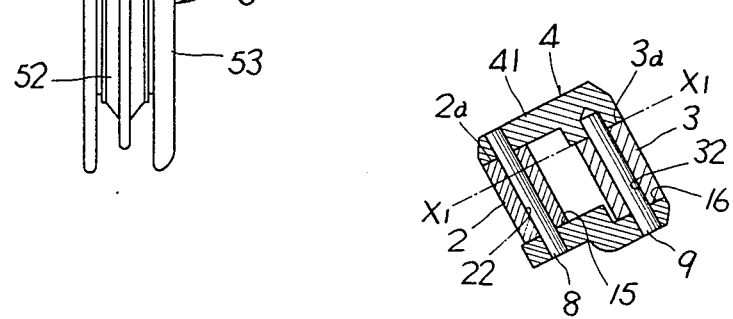

FIG. 4
(a)
(b)
FIG. 5
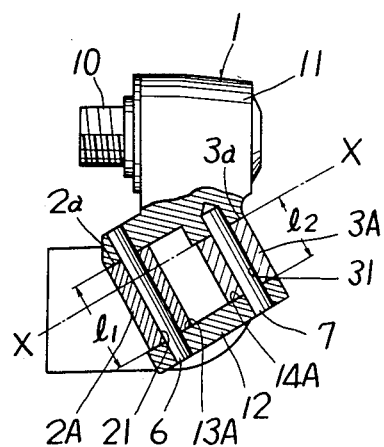
FIG. 6
(PRIOR ART)
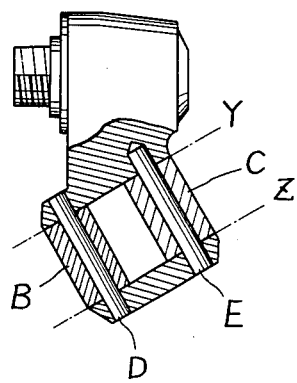

DERAILLEUR FOR A BICYCLE

FIELD OF THE INVENTION

The present invention relates to a derailleur for a bicycle for shifting a driving chain to a desired one sprocket of a multistage sprocket assembly of the bicycle, and more particularly, to a derailleur for a bicycle, which is provided with a linkage mechanism comprising four members formed of a base member, inner and outer linkage members pivotally supported to the base member through a pair of connecting pins, and a movable member carrying a chain guide and pivotally supported to the linkage members through a pair of connecting pins, so that a control wire is operated to deform the linkage mechanism to move the chain guide in reciprocation and shift the chain to a desired one sprocket of the multistage sprocket assembly by means of the chain guide, thereby changing the bicycle speed.

BACKGROUND OF THE INVENTION

Generally, this kind of derailleur is so constructed that (1) the base member and movable member are provided with support portions having recesses for receiving therein ends of the linkage members respectively, (2) the connecting pins are fitted at both ends into the support portions so as to be fixed thereto, (3) the linkage members are provided at both lengthwise ends with through-bores into which the connecting pins are freely inserted respectively, and (4) the linkage members are connected to the base member and movable member respectively, thereby forming a linkage mechanism, so that the linkage mechanism is deformed to allow the chain guide to move in reciprocation.

A conventional derailleur which is well-known, as disclosed in Japanese Patent Publication Gazette No. Sho 42-23,485, has connecting pins slanted with respect to a plane perpendicular to the axis of the multistage sprocket assembly respectively, so that when the linkage mechanism is deformed, the chain guide is moved not only axially of the multistage sprocket assembly but also radially thereof.

However, in such conventional derailleur construction, the linkage members B and C, as shown in FIG. 6, are equal in width to each other and the upper surfaces and lower surfaces of the linkage members B and C are coincident with a phantom line Y connecting the upper surfaces of the linkage members B and C and perpendicular to the axes of connecting pins D and E and a phantom line Z connecting the lower surfaces of the same and perpendicular to the axes of the pins D and E. Hence, there are gaps between the inner peripheries of the through bores of the linkage members B and C and the outer peripheries of the connecting pins fitted into the through bores, thereby creating large backlashes in the linkage mechanism.

In other words, when the chain guide is moved in reciprocation axially and radially of the multistage sprocket assembly due to deformation of the linkage mechanism, each linkage member is subjected to a torsion to create a backlash in an allowable range of the gap with respect to the base member, thereby creating a condition in which the position of the chain guide after being moved is unstable.

Therefore, in a case where a derailleur or a speed control device therefor is provided with a positioning mechanism, a difference is created between the speed change stroke and the movement of the chain guide, thereby creating a problem in that the speed change efficiency is deteriorated.

Also, when the connecting pins are slanted as described above the inner linkage member is displaced downwardly with respect to the outer linkage member, so that a height of the portion of the linkage mechanism at the base member side becomes larger, thereby creating a problem in that the portion of the linkage mechanism at the base member side is liable to strike foreign objects and also the entire derailleur of necessity is quite large.

SUMMARY OF THE INVENTION

An object of the present invention is to provide a derailleur for a bicycle which connects linkage members to a base member and a movable member through slanted connecting pins so as to reduce a backlash in a linkage mechanism caused by each gap between the through bores formed at the inner and outer linkage members and the connecting pins fitted into the through bores respectively.

Another object of the present invention is to provide a derailleur for a bicycle which is smaller in height at a portion of the base member for connecting the linkage members.

The present invention provides a derailleur which is provided with a linkage mechanism comprising four members of a base member, an inner linkage member and an outer linkage member pivotally supported to the base member through a pair of connecting pins, and a movable member carrying a chain guide and pivotally supported to the linkage members through a pair of connecting pins so that the connecting pins are slanted with respect to a plane perpendicular to the axis of a multistage sprocket assembly and the chain guide is moved axially and radially of the multistage sprocket asesmbly when the linkage mechanism is deformed. The inner linkage member is pivotally supported to the base member such that the upper surface of the inner linkage member is located on a side closer to the axis of the multistage sprocket assembly relative a phantom extension line X—X extending from the upper surface of the outer linkage member and perpendicular to the axis of the connecting pin for connecting the outer linkage member to the base member.

When the linkage mechanism is deformed, the inner and outer linkage members rotate around the connecting pins respectively. In this case, since the upper surface of the inner linkage member is displaced as described above, a height or length L between the upper surface of the inner linkage member and the lower surface of the outer linkage member is made larger than a width of each linkage member, thereby achieving the same results as when the width of each linkage member is increased. Hence, the backlash in the linkage mechanism caused by the gaps between the inner and outer linkage members and the connecting pins is reduced even though the width of each linkage member is not enlarged. Also, the inner linkage member is displaced with respect to the outer linkage member as described above, whereby an entire height of the portion of connecting the linkage members to the base member can be reduced.

These and other objects of the invention will become more apparent in the detailed description and examples which follow.

BRIEF DESCRIPTION OF THE DRAWINGS

FIG. 1 is a partially cutaway side view of a first embodiment of a derailleur of the invention, which is assembled together with a multistage sprocket assembly on a bicycle frame, FIG. 2 is a sectional view of a connecting portion of linkage members with a movable member, FIG. 4 is an illustration showing a difference between inclinations of the linkage members with respect to connecting pins, FIG. 5 is a partially cutaway side view of the principal portion only of a second embodiment of the invention, and FIG. 6 is an illustration of a conventional type of derailleur.

DETAILED DESCRIPTION OF THE INVENTION

Figure 3:
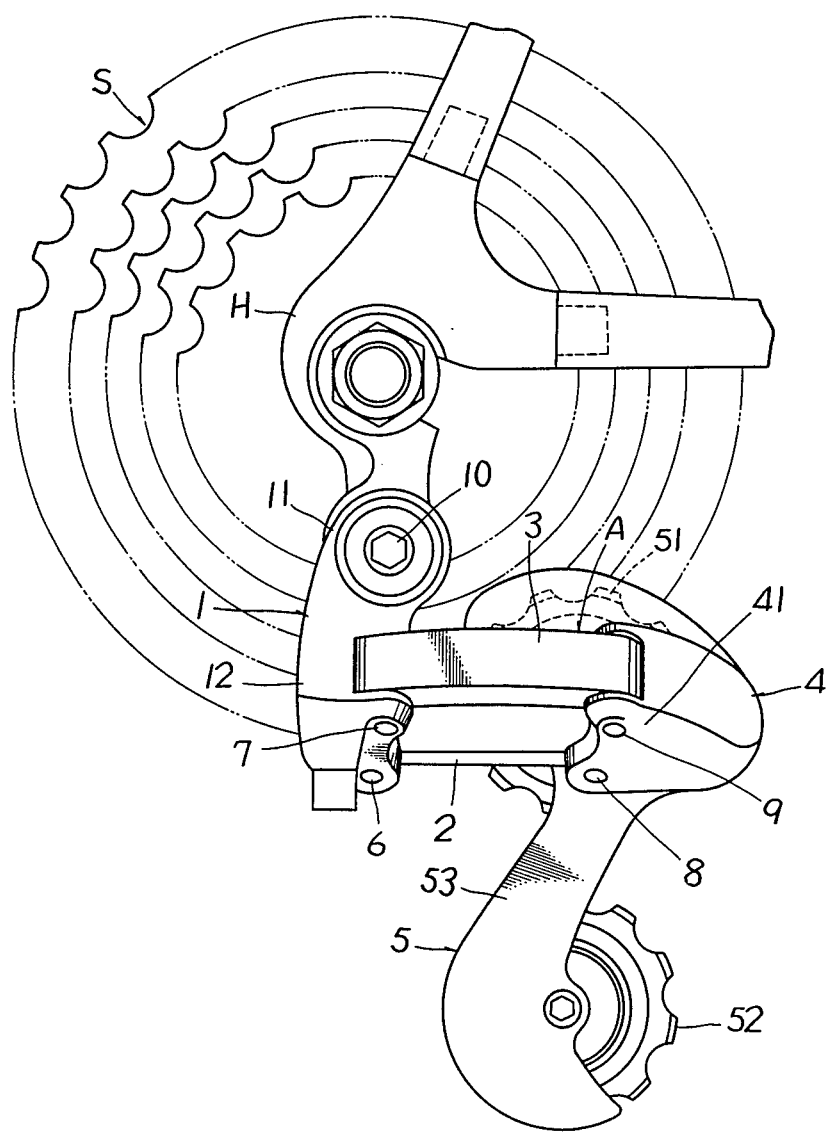
FIG. 3 is a front view of the derailleur of the invention in the same condition as FIG. 1.

FIGS. 1 to 3 show a rear derailleur which fundamentally comprises four members of a base member 1, an inner linkage member 2 and an outer linkage member 3 pivotally supported to the base member 1 through a pair of connecting pins 6 and 7 respectively, and a movable member 4 carrying a chain guide and pivotally supported to the linkage members 2 and 3 through a pair of connecting pins 8 and 9.

The connecting pins 6, 7, 8 and 9 are oriented obliquely or slanted with respect to the plane perpendicular to the axis of a multistage sprocket assembly S, so that the chain guide 5, when the linkage mechanism A is deformed, moves both axially and radially of the multistage sprocket assembly S. The base member 1 is supported swingably to a first horizontal shaft 10 mounted on a fork end H of the bicycle frame a first spring (not shown) for biasing the linkage mechanism A clockwise in FIG. 3 is interposed between the first horizontal shaft 10 and the base member 1, and a second spring (not shown) for biasing the linkage mechanism A clockwise in FIG. 3 is interposed between the movable 4 and the chain guide 5. The first and second springs balance with each other to set the chain guide 5 in given neutral radial position of the multistage sprocket assembly S.

The base member 1 is provided with a cylindrical boss 11 supported rotatably to the first horizontal shaft 10 and a support 12 projecting downwardly from the boss 11 and supporting one end of the linkage members 2 and 3. Support 12 is provided with recesses 13 and 14 which receive therein and fix both ends of the pins 6 and 7 respectively.

The linkage members 2 and 3 are formed equal in width to each other and provided at both the lengthwise ends with through-bores 21, 31, 22 and 32 into which the connecting pins 6, 7, 8 and 9 are freely inserted respectively.

The movable member 4 is provided with a support 41 for supporting the linkage members 2 and 3 at their other ends and a boss 42 for supporting a second horizontal shaft (not shown) and a second spring (not shown). Support 41 is provided with recesses 15 and 16 which receive therein the connecting pins 8 and 9 and fix them respectively.

The chain guide 5 comprises a guide pulley 51, a tension pulley 52 and a pulley plate 53 for supporting the pulleys 51 and 52, the pulley plate 53 being fixed to the second horizontal shaft.

The linkage mechanism A constructed as described above is provided with a return spring (not shown) between (1) the linkage member 2 or 3 and (2) the movable member 4 or base member 1, thereby biasing by the return spring the chain guide 5 axially of the multistage sprocket assembly, in other words, toward either the top gear or the low gear, normally toward the former. A fixture (not shown) for a control wire is provided at the linkage member 2 or 3 or the movable member 4, so that the control wire is pulled to deform the linkage mechanism A against the return spring, whereby the chain engaging with the guide pulley 51 and tension pulley 52 is moved axially of the multistage sprocket assembly and shifted to a desired one sprocket thereof.

The first embodiment shown in FIGS. 1 to 4 is provided at the support 12 of the base member 1 with a first recess 13 for receiving therein one end of the inner linkage member 2 and with a second recess 14 for receiving therein one end of the outer linkage member 3. First recess 13 is positioned closer to the axis of the multistage sprocket assembly S than is second recess 14, so that the inner linkage member 2 is pivotally supported to the first recess 13 such that the upper surface 2a of the inner linkage member 2 is located on a side closer to the axis of the multistage sprocket assembly S relative to a phantom extension line X—X extending from the upper surface 3a of the outer linkage member 3 and perpendicularly to the axis of the connecting pin 7 for the outer linkage member 3.

In addition, both ends of the inner linkage member 2, i.e., its end connected to the movable member and its connected to the base member have an upper surface 2a positioned on a side closer to the axis of the multistage sprocket assembly S relative to a phantom extension line $X_1$—$X_1$ extending from the upper surface 3a of the outer linkage member 3 and perpendicularly to the axis of the connecting pin 9 therefor as shown in FIG. 2. However, these relative positions are not indispensable.

In the first embodiment, the height L of support 12 of base member 1 for the connecting pins 6 and 7 is equal to the sum of a width l of outer linkage member 3 and an amount by which inner linkage member 2 is located closer to the axis of the multistage sprocket assembly S than is outer linkage member 3.

In other words, the height L is larger by this amount than a width of either linkage member 2 or 3 itself, thereby achieving the same results as when the width of either linkage member 2 or 3 is enlarged to be equal to the height L. Accordingly, an inclination $\theta$ of each linkage member 2 or 3 with respect to each connecting pin 6 or 7 as shown in FIG. 4a is made smaller than angle $\theta_1$ of each linkage member 2 or 3 with respect to the pin 6 or 7 when the height L is equal to the width l of each linkage member 2 or 3 as shown in FIG. 4b. As a result, when the gaps between the linkage members 2 and 3 and the connecting pins 6 and 7 are not different in size from each other, the backlash of each linkage member 2 or 3, and in turn the linkage mechanism A, caused by the gap can be reduced.

Also, since the inner linkage member 2 is displaced with respect to the outer linkage member 3 as described above the entire height of the support 12 of base member 1 can be reduced.

Alternatively, the linkage members 2 and 3 may be different in width from each other as shown in FIG. 5.

Referring to FIG. 5, a second embodiment of the invention is shown, in which (1) an inner linkage member 2A has a width $l_1$ larger than width l of the inner linkage member 2 in the first embodiment, (2) an outer linkage member 3A has a width $l_2$ equal to or smaller than width l of the outer linkage member 3 at the first embodiment, and (3) a first recess 13A at the base member 1 for receiving one end of the inner linkage member 2A is made larger in width than a second recess 14A for receiving one end of the outer linkage member 3A, so that the upper surface of the inner linkage member 2A is positioned on a side closer to the axis of the multistage sprocket assembly S with respect to the aforesaid extension line X—X. In this embodiment, since the width $l_1$ of the inner linkage member 2A is larger than width $l_2$ of the outer linkage member 3A, when the gaps between the linkage members 2A and 3A and the connecting pins 6 and 7 are not different in the size from each other, the backlash of each linkage member 2A or 3A, and in turn the linkage mechanism, can be reduced. Also, the entire height of the support at the base member 1 can be reduced.

As seen from the above discussion, the present invention provides connecting pins 6, 7, 8 and 9 which are oriented obliquely or slanted relative to the plane perpendicular to the axis of the multistage sprocket assembly, and the height of the connecting portion of the linkage members 2 and 3 with the base member 1 is made larger than the width of each linkage member itself, thereby achieving the same results as when the width of each linkage member is enlarged. As a result, the backlash in the linkage mechanism caused by the gap between each linkage member 2 or 3 and each connecting pin 6 or 7 is reduced. Hence, when the derailleur or the speed control device is provided with a positioning mechanism, a difference between the speed change stroke and the movement of the chain guide is reduced, thereby improving the speed change efficiency to that extent.

Furthermore, the height of the support at the base member can be reduced, thereby enabling the support at the base member to be prevented from striking foreign objects and also the derailleur to be small-sized as a whole.

Although several embodiments have been described, they are merely exemplary of the invention and not to be construed as limiting, the invention being defined solely by the appended claims.

What is claimed is:

1. A derailleur for a bicycle, for shifting a driving chain from one sprocket to another of a multistage sprocket assembly, said derailleur comprising:
    a linkage mechanism comprising a base member, an inner linkage member, an outer linkage member, and a movable member carrying a chain guide; and
    a connecting means comprising a pair of first connecting pins for respectively pivotally supporting one end of each of said inner linkage member and said outer linkage member to said base member and a pair of second connecting pins for respectively pivotally supporting said movable member to the other end of each of said inner linkage member and said outer linkage member, said first and second connecting pins being oriented obliquely with respect to a predetermined plane adapted to be positioned perpendicular to an axis of said multistage sprocket assembly when said derailleur is mounted on said bicycle, said chain guide, responsive to deformation of said linkage mechanism, being movable axially and radially of said multistage sprocket assembly when said derailleur is mounted on said bicycle;
    said inner linkage member having an upper surface at its said one end connected to said base member which is positioned at a predetermined position adapted to be located on a side closer to said axis of said multistage sprocket assembly relative to a phantom extension line extending from an upper surface of said outer linkage member at its said one end connected to said base member and perpendicular to an axis of the one of said first connecting pins which connects said outer linkage member to said base member.

2. A derailleur for a bicycle according to claim 1, wherein said base member comprises a first recess and a second recess respectively receiving said one end of said inner linkage member and said one end of said outer linkage member, said first recess being positioned at a predetermined position adapted to be located on a side closer to said axis of said multistage sprocket assembly relative to said phantom extension line than said second recess.

3. A derailleur for a bicycle according to claim 2, wherein said inner linkage member and outer linkage member are equal in width to each other.

4. A derailleur for a bicycle according to claim 1, wherein said base member comprises a first recess and a second recess respectively receiving said one end of said inner linkage member and said one end of said outer linkage member, said first recess being larger than said second recess, said inner linkage member being larger in width than said outer linkage member, said inner linkage member having an upper surface at its said one end connected to said base member which is positioned at a predetermined position adapted to be located on a side closer to said axis of said multistage sprocket assembly relative to said phantom extension line than an upper surface at said one end of said outer linkage member connected to said base member.

* * * * *